United States Patent [19]

Dybvig

[11] 4,269,219
[45] May 26, 1981

[54] FITTINGS FOR RELEASABLY INTERCONNECTING A FUEL TANK WITH AN INTERNAL COMBUSTION ENGINE

[76] Inventor: Helge Dybvig, Strömsdalen 22, 4600 Kristiansand S, Norway

[21] Appl. No.: 28,992

[22] Filed: Apr. 11, 1979

[30] Foreign Application Priority Data

Apr. 17, 1978 [NO] Norway .................................. 781326

[51] Int. Cl.³ ............................................. F16L 37/28
[52] U.S. Cl. .................................. 137/322; 251/149.6; 137/614.03
[58] Field of Search ...................... 137/614.03, 614.04, 137/572, 322; 251/149.6; 285/137 R; 141/52, 59

[56] References Cited

U.S. PATENT DOCUMENTS

| | | |
|---|---|---|
| 2,628,850 | 2/1953 | Summerville ............... 285/137 R X |
| 2,638,915 | 5/1953 | Mitchell ........................... 137/322 X |
| 2,981,322 | 4/1961 | Schum ................................ 251/149.6 |
| 3,409,040 | 11/1968 | Weston et al. ........................ 137/572 |

*Primary Examiner*—William R. Cline
*Attorney, Agent, or Firm*—Watson, Cole, Grindle & Watson

[57] ABSTRACT

A fuel system, particularly adapted for boats, includes a releasable coupling for connecting a tube or hose between the fuel tank and the engine. The coupling includes a fuel valve and a vent valve both adapted to automatically open and close respectively upon connecting and disconnecting mating parts of the coupling. The vent valve is adapted to open before the fuel valve is opened for venting any pressure head within the tank which is likely to cause leakage in the fuel hose or tube, such venting taking place through both mating parts and through the hose to a location remote from the tank.

1 Claim, 1 Drawing Figure

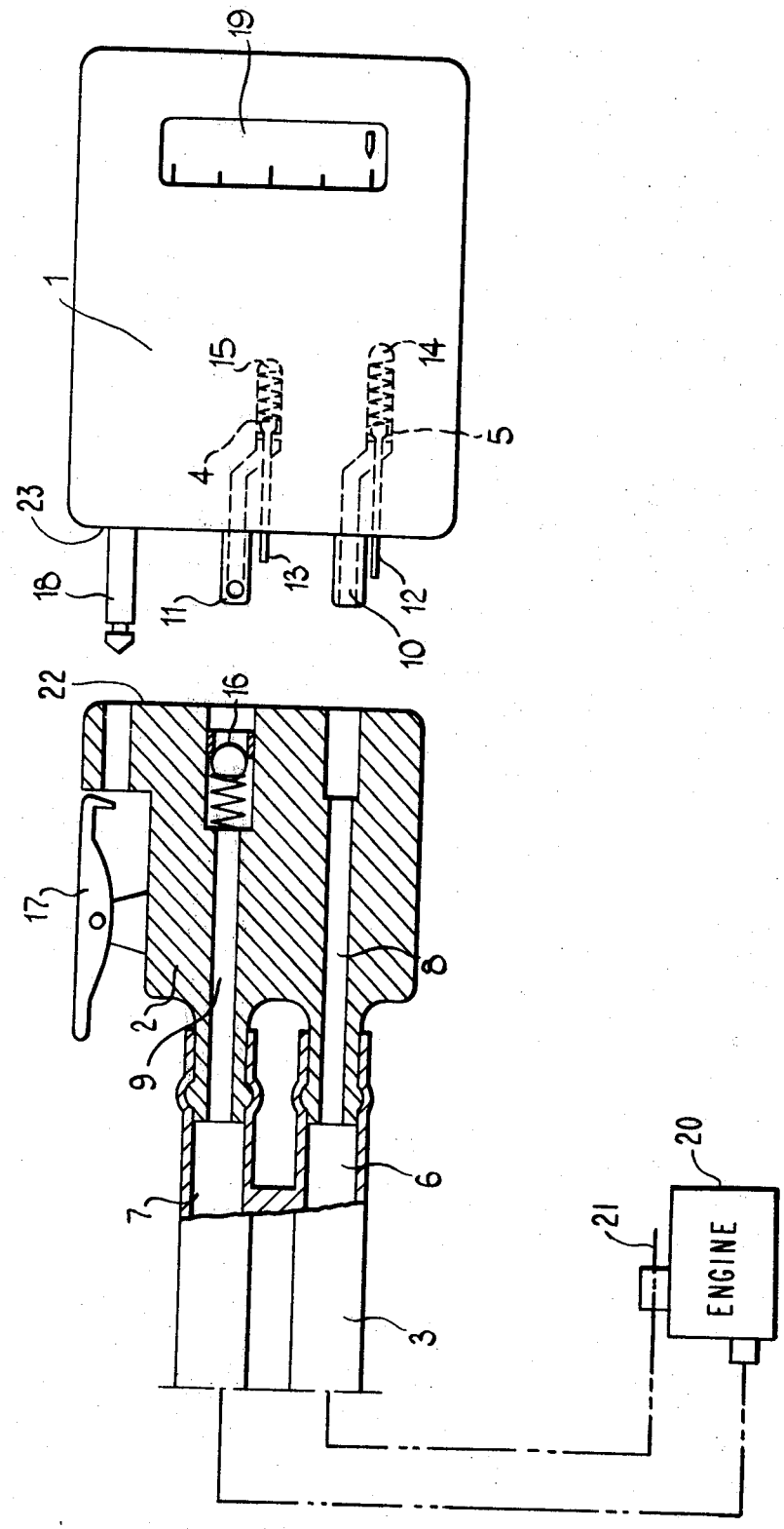

FITTINGS FOR RELEASABLY INTERCONNECTING A FUEL TANK WITH AN INTERNAL COMBUSTION ENGINE

BACKGROUND OF THE INVENTION

The present invention relates to a fuel system, particularly adapted for boats, and comprises a releasable coupling for connecting a tube or hose between the fuel tank and the engine, the coupling comprising a fuel valve adapted to open and close automatically when the coupling parts are respectively connected and disconnected.

For smaller boats a fuel system is commonly used in which a fuel hose between the fuel tank and the engine can be disconnected when the boat is not in use. Such systems are particularly used for boats having an outboard engine and a fuel tank separate from the engine. These fuel tanks are usually not permanently installed, but are portable, so that the user of the boat may bring the tank along when leaving the boat, or put the tank into, for example, a closeable compartment on board the boat.

The hose being used to connect the tank and the engine is usually adapted to be disconnected from both the tank and the engine, and is always adapted to be disconnected from at least one of them. The coupling used in the system, at one or both ends of the hose, is usually a quick coupling which comprises a fuel valve adapted to open automatically when the coupling parts are brought together. The fuel valve, which is usually situated in the coupling part mounted on the tank and/or the engine, may comprise a spring biassed valve element, and the coupling part or parts mounted on the hose may comprise a hollow stud in communication with the hose. When the cooperating coupling parts are connected, the hollow stud urges the valve element to an open position, and the spring urges the valve element to a closing position when the coupling part on the hose is removed.

In order to prevent the coupling parts from being unintentionally disconnected the couplings are usually equipped with a retaining hook or the like, which must be released by hand before the coupling parts can be pulled apart.

To prevent the development of an increasing sub-atmospheric pressure inside the tank caused by the suction of fuel to the engine, the couplings usually comprise a vacuum valve. This valve is a one-way valve, for example, a valve element which is biassed towards a valve seat by a spring. Thus, the valve will open for inlet of air into the tank when the sub-atmospheric pressure has reached a predetermined value, but will mainly be closed when the vacuum is less than such value and when there is a pressure above the atmospheric pressure inside the tank.

The above prior art systems show discrepancies which constitute a danger. Experiences show that during storage of such fuel tanks, large pressures are also developed in the tanks, especially when they are kept in warm places. This fact does not itself constitute a disadvantage, because the tanks are adapted to withstand considerable pressures, and from a safety standpoint interior pressure above atmospheric is more desirable than letting fuel vapour escape at the storage location, which would thus increase the risk of explosion and fire.

However, the danger due to the pressure inside the tank is brought about when the hose is connected to the tank after the tank has been brought on board the boat. The pressure head inside the tank increases the possibility of leakages from the coupling itself, the hose or the vacuum valve. In particular when the couplings are worn there will be insufficient sealing between the coupling part on the tank and/or on the engine and the coupling part or parts on the hose. The pressure may cause the fuel to leak into the boat. Also the hose may be unable to withstand the pressure, and the fuel may escape through fissures. A particularly weak point is the bladder which is normally situated on the hose, for the purpose of pumping fuel to the engine prior to starting such as when there is only a small pressure head inside the tank. Moreover, the vacuum valves in the prior art couplings have shown to produce fuel leakages. The passage in which the vacuum valve is situated opens in the vicinity of the tank, and fuel vapour incidentally leaking through the vacuum valve because of the pressure head will accumulate inside the boat.

In the above manner a large quantity of fuel, in the form of liquid or vapour, may escape from the fuel system and accumulate in the boat, and may give rise to an explosion and fire. Experience has shown that this happens, and the prior art systems are thus not safe in this respect.

SUMMARY OF THE INVENTION

It is an object of the present invention to provide an improved system in which the danger of fuel leakage into boats due to a pressure head in the fuel tanks is eliminated.

A further object of the invention is to provide an improved system which does not involve substantially increased costs of manufacture compared with the prior art systems.

The system according to the present invention comprises a hose or tube for transfer of fuel between a fuel tank and an engine, the hose or tube being adapted to be disconnected at least from the tank, which has a coupling part including a fuel valve which is opened and closed automatically by connecting and disconnecting a coupling part on the hose or tube, and the improvement is achieved in that the coupling part situated on the tank includes a vent valve which is adapted to open and close automatically by connecting and disconnecting the coupling part on the hose or tube to and from the coupling part on the tank, and that the coupling part on the hose or tube is adapted to be permanently connected to a passage adapted to open outside the interior of the boat.

Preferably, the vent valve is adapted to open, by connection of the coupling part on the hose or tube, before the fuel valve is opened.

When the fuel passage leads to a carburetor or an injection pump of an outboard engine, the venting passage may conveniently open out in the vicinity of the engine.

The vent valve and the venting passage will have the effect that a possible pressure head inside the tank will immediately be relieved, because fuel vapour will flow through the vent valve and the venting passage when the coupling parts are brought together.

Provided that, according to a preferred embodiment of the invention, the vent valve opens somewhat earlier than the fuel valve during the coupling procedure, the possible pressure head inside the tank will be completely relieved, or at least substantially reduced by the time the fuel valve opens, and there is no possibility for the pressure head to cause leakage in the fuel hose or tube.

The passage in which the vent valve is situated of course opens inside the tank near the top of the tank, so that normally only fuel vapour and not liquid fuel escapes through the venting passage.

The venting passage may conveniently be permanently coupled to the same coupling part as the fuel passage. This will make it necessary to connect the fuel passage and the venting passage to the coupling part situated on the tank simultaneously (with the exception of the delayed opening of the fuel valve, as mentioned) thereby making it impossible to delete the coupling of the venting passage when the fuel passage is coupled.

The venting passage and the fuel passage may conveniently be formed as parallel passages in one single hose, i.e. a double passage hose. This will be suitable for the use in outboard engine boats. Provided that the fuel passage is releasably connected to a carburetor or an injection pump by means of a coupling, and provided that the fuel passage and the venting passage are of substantially the same length, the open end of the venting passage will always be situated in the vicinity of the engine when the fuel passage is connected. The venting passage may also be somewhat longer than the fuel passage, so that the venting passage extends past the coupling for the fuel passage, to ensure that the venting passage opens outside of the boat hull.

Another advantage which is achieved with the system according to the present invention is that a vacuum valve is superflous. During use the tank will have open communication with the air through the open vent valve and the venting passage, and the suction of fuel from the tank to the engine will not create low pressure in the tank, because air will flow into the tank. Thus, the pressure inside the tank and the pressure in the surrounding air will be equalized by means of the venting passage when the hose is connected to the tank.

DETAILED DESCRIPTION OF THE INVENTION

The invention will hereinafter be described more in detail with reference to the accompanying drawing, which shows two main parts 1 and 2 of a coupling applied in the system according to the invention. The first main part, or fuel and air valve fitting 1, is adapted to be mounted on a fuel tank, and may in a known manner be combined with an indicator 19 for the quantity of fuel present in the tank. The second main part, or hose fitting 2, is connected to a hose 3, which in the example shown is a dual conduit hose having one conduit 6 for venting of the tank and one conduit 7 for transfer of fuel to the engine. During use the fuel conduit will of course be connected to the carburetor or injection pump (not shown) of the engine 20, and the venting conduit may open out as at 21 in the vicinity of the engine. The dual conduit hose 3 may be split in the middle area between the conduits near the opposite end (not shown), thus making it possible to bend the venting conduit away from the engine for opening outside the boat hull, and this end of the venting conduit may also be extended past the fuel conduit.

Hose fitting 2 has a fuel passage 9 therein which opens into an end wall 22 and which communicates with fuel conduit 7 of hose 3. The hose fitting is further provided with a vent passage 8 opening into end wall 22 and communicating with vent conduit 6 of hose 3.

The first main part 1 of the coupling may in a known manner be provided with a guiding and locking stud 18 which is adapted to be introduced in a confronting bore in the second main part 2 and to be thereby locked in place by means of a spring biassed lever 17 having a hook adapted to engage a notch on the stud 18.

The valves 4 and 5 in the first coupling part 1, for fuel and venting, respectively, are in the example shown of mutually similar construction, and comprise spring biassed balls which are urged towards valve seats. The valves 4 and 5 are in open communication with the inner space in the tank, through the passages 14 and 15. The passage 15 for the fuel protrudes to the vicinity of the bottom of the tank, and the venting passage 14 opens in the vicinity of the top of the tank. The opening of the valves is effected by means of the pins 12 and 13. It will be apparent that when the main parts 1 and 2 of the coupling are brought together, the pins will bear against wall 22 and will be urged thereby inwardly in the coupling part mounted on the tank to thereby cause the valves 4 and 5 to open.

Coupling part 2 mounted on the hose 3 may include a known one-way valve 16 in the fuel passage 9, in order to prevent the fuel present in the hose and the coupling part 2 from escaping when the coupling parts are disconnected. Opening of the one-way valve may be effected by means of a sleeve or fuel nipple 11, which extends outwardly of wall 23 of fitting 1, and which acts to urge the valve ball away from its seat. And, a sleeve or air nipple 10 extends outwardly of wall 23 and into passage 8 for establishing comunication between passages 8 and 14 when fittings 1 and 2 are coupled together.

The pin 12 for the opening of the venting valve may advantageously protrude somewhat further out from the coupling part 1 than the pin 13 for the opening of the fuel valve. Thus the venting passage opens somewhat earlier than the fuel passage during the coupling procedure, and a possible pressure head inside the tank will be relieved by the outflow of fuel vapour prior to the flow of liquid fuel from the tank. This ensures that the liquid fuel will not flow past the valve 4 before the pressure head in the tank is released.

It will be appreciated that the system according to the present invention may comprise valves of other types than the ones shown and described, that the coupling parts may be of other configurations than the ones shown and described and that there may be employed two separate hoses or tubes instead of the double passage hose shown and described. It is of no importance whether the fuel passage is adapted to be releasably or permanently coupled to the carburetor or injection pump of the engine.

The system according to the invention may be applied for all types of fuels which are liquid under atmospheric pressure, but the most important application is for fuels which form explosive vapours, such as gasoline.

I claim:

1. In a coupling for releasably interconnecting a fuel tank with an internal combustion engine, comprising a hose fitting having a fuel passage opening into an end wall of said fitting, hose means on said fitting including a fuel conduit in communication with said fuel passage for connection with the engine, an air and fuel valve fitting having air vent and fuel passages respectively communicating with air and fuel within the tank, spring biased valves in said fuel passage and in said air vent passage of said air and fuel valve fitting, a depressible fuel valve stem and a depressible air vent valve stem respectively on said valves of said fuel and air valve fitting extending outwardly thereof, said valves being unseated respectively by said stems upon a coupling together of said fittings, the improvement wherein said hose fitting is provided with an air vent passage opening into said end wall, said hose means including an air vent conduit terminating at a location remote from said fittings, an air vent nipple extending from one of said fittings as an extension of said air passage thereof, said air vent nipple extending into the air vent passage of the other fitting upon a coupling together of said fittings, said air vent valve stem extending from said air and fuel valve fitting a greater distance than the extent of said fuel valve stem therefrom for opening said air vent passages earlier than said fuel passages upon the coupling together of said fittings, whereby any elevated pressure within the tank is vented prior to the opening of said fuel passages, such pressure being vented through both said fittings and through said air vent conduit to thereby avoid any escape of fuel gas from the tank into the immediate vicinity thereof.

* * * * *